Sept. 17, 1968 D. D. EDEN 3,402,002
45° CUT LOW VOLTAGE OPTICAL MODULATOR
Filed May 28, 1964 2 Sheets-Sheet 1

INVENTOR
Dayton D. Eden
BY Thomas A. Harwood
ATTORNEY

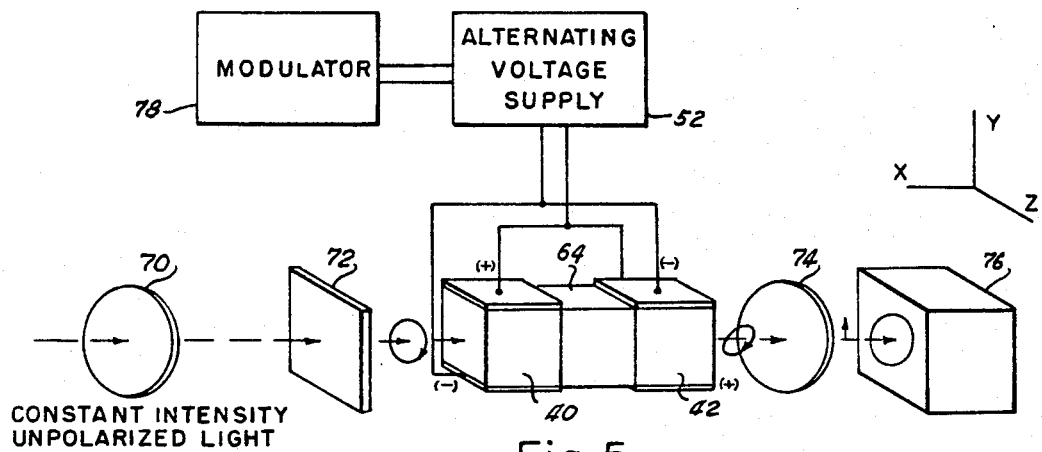
Fig. 5
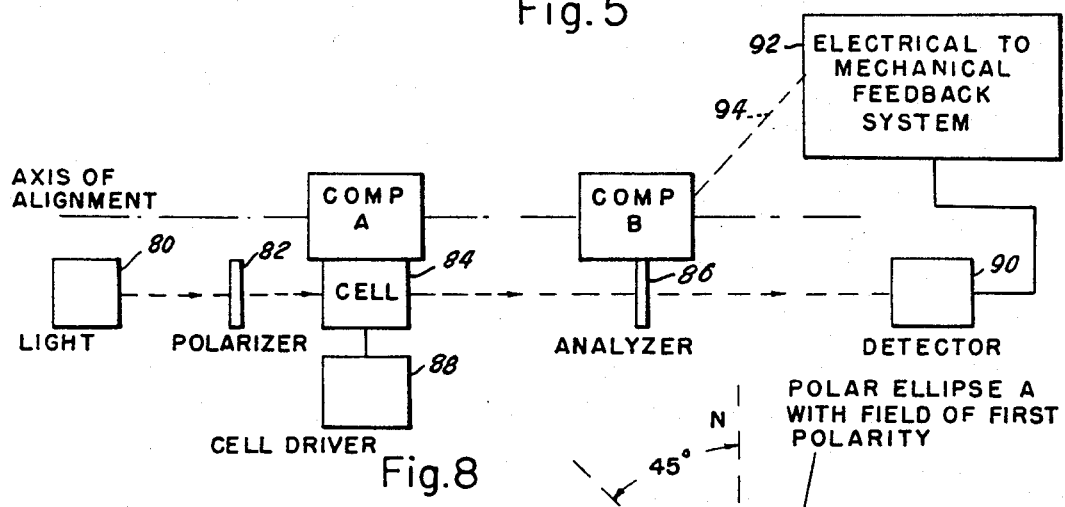
Fig. 8
Fig. 7
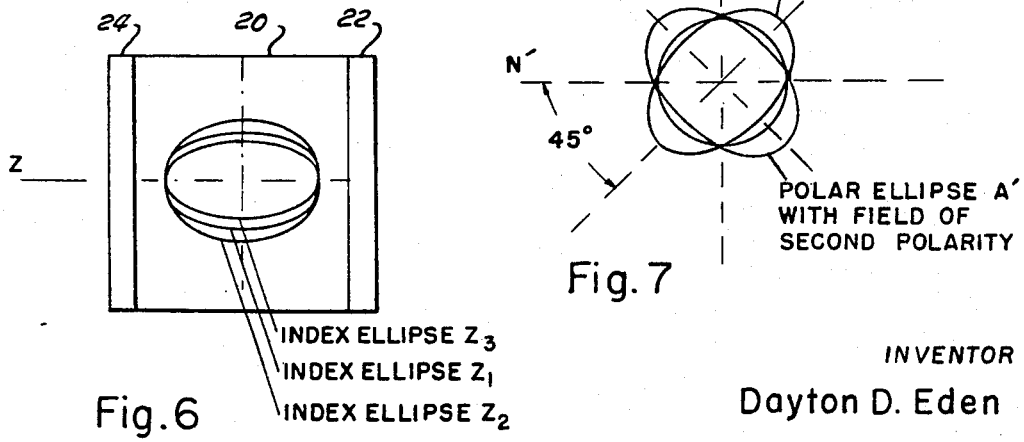
Fig. 6

United States Patent Office 3,402,002
Patented Sept. 17, 1968

3,402,002
45° CUT LOW VOLTAGE OPTICAL MODULATOR
Dayton D. Eden, Dallas, Tex., assignor to Texas Instruments Incorporated, Dallas, Tex., a corporation of Delaware
Filed May 28, 1964, Ser. No. 371,053
10 Claims. (Cl. 350—150)

ABSTRACT OF THE DISCLOSURE

Disclosed herein is an optical modulator of birefringent material cut so that each of the $x$ and $y$-axes of the crystal material makes an angle of 45° to one of the surfaces thereof with the $z$-axis being parallel to this surface; a substantial improvement in the light modulation obtainable as well as a substantial reduction in the voltage required to obtain this modulation results from this cut. Furthermore, by joining two similarly cut crystals in a predetermined manner, changes in phase caused by temperature variations are cancelled.

---

This invention relates to optical modulation and more particularly to the phase modulation between the linear components of a polarized light beam to effect intensity modulation thereof.

There are many applications where the intensity modulation of a light beam is required or desirable, with the communications field being one area of interest. Although both frequency and amplitude modulation of an alternating electric signal has been advanced for many years, there are instances where it is desirable to utilize an optical beam rather than an electrical signal either as an alternate thereto or where it is impractical to use an electrical signal. In the communications field, for example, a secret means of communication can be provided by transmitting a light beam from one location to another, assuming that the desired information can be impressed upon the light beam. This requires modulation of the light beam intensity. In other areas, optical shutters are required, in which case, modulation of a light beam is again a necessity. Another specific example of the use of an intensity modulated light beam is disclosed in the copending application of John L. Snyder III, entitled, Optical Instrument for Determining the Parallelism or Non-parallelism of Two Reflecting Surfaces, Ser. No. 349,454, filed Mar. 4, 1964, and assigned to the common assignee, wherein there is described a polarimeter system for measuring the parallelism between two spaced apart reflecting surfaces. The modulated light beam is utilized in what is known as a "twist" system for maintaining alignment between two 90° prism systems. As will become readily apparent, there are many other applications where the efficient modulation of a light beam is desirable.

Although a light beam may be modulated in intensity in various ways, the most successful technique yet devised is by passing a polarized light beam through a solid-state crystal, which is normally birefringent, and utilizing the Pockel's effect to produce the necessary modulation. The light beam in such case is elliptically, circularly or linearly polarized, whereby the polarized light can be schematically represented by two perpendicular amplitude vectors whose magnitudes vary sinusoidally at a given phase angle to each other. By creating an electric field within the crystal through which the optic beam traverses, the crystal's birefringence may be altered to cause a differential change in the velocity of the two perpendicular vectors. Consequently, the phase between the two perpendicular components is altered to effect a phase modulation depending upon the electric field strength, length of the crystal traversed by the light beam, the particular crystal used and other factors. By using an analyzer, such as linear polarizer plate, the light beam is amplitude modulated when it passes therethrough. All of this is well known, including the Pockel's effect to produce the necessary phase modulation.

The amount of modulation that can be achieved by passing a light beam through a Pockel's cell of the conventional type is expressed by the relation $$\Delta\phi = 2\pi l N_o^3 r_{ij} E / \lambda_o$$

where $\Delta\phi$ is a quantitative measure of the change of phase between the two perpendicular components of a polarized light beam traversing the crystal, $l$ is the length of the crystal traversed by the light beam, $r_{ij}$ is the Pockel's coefficient, $E$ is the electric field established within the crystal, $N_o$ is the ordinary index of refraction of the crystal and $\lambda_o$ is the free space wave-length of the light used. The above relation usually applies for substantially monochromatic light, and it can be seen that the degree of modulation of the light is dependent upon the length of the crystal traversed by the light, and is directly proportional to the magnitudes of the Pockel's coefficient and the electric field established within the crystal.

There are several materials which exhibit the Pockel's effect in the presence of an electric field, such as juartz ($SiO_2$), potassium-dihydrogen-phosphate or $$KDP(KH_2PO_4)$$

cuprous-chloride (CuCl) and hexamethylenetetramine (HMTA), as examples. Here, quartz has a hexagonal crystal structure, KDP has a tetragonal structure, CuCl is cubic as is HMTA. Actually, there are many crystal classes which exhibit a Pockel's effect in the presence of an electric field, and in general, these are all crystals which also exhibit piezoelectric properties as will be explained more fully later. However, the magnitude of the Pockel's coefficient exhibited by these crystals is small, and to achieve any considerable degree of phase modulation of a light beam, a very large voltage is required to establish the necessary electric field within the crystal. For example, in most crystals which exhibit the Pockel's effect, it is necessary to apply a voltage in the order of several kilovolts across the crystal to create the necessary electric field to achieve a relative phase change between the two perpendicular components of a polarized light beam of 90° during its traversal of the entire crystal length. Not only is this an impractically large voltage for many applications, but in addition, very little modulation is achieved.

To overcome these problems and greatly increase the amount of phase modulation, the present invention utilizes a Pockel's cell comprised of a single crystal of KDP (potassium-dihydrogen-phosphate) cut so that the $x$ and $y$-axes of the crystal make an angle of 45° to a surface of the crystal with the $z$-axis being parallel to this surface, and the optical beam to be modulated is passed through the crystal perpendicular to the $z$-axis and an angle of 45° to each of the $x$ and $y$-axes. Here, the the $x$, $y$ and $z$-axes designations of the crystal are well known in the art. An electric field is established within the crystal parallel to the $z$-axis, and under these conditions, it will be shown that if the distance over which the electric field is established is very small in relation to the length of the crystal through which the light traverses, only a very small voltage is required to produce a very considerable degree of phase modulation of the light beam. Consequently, a large Pockel's coefficient is not necessary to achieve the desired modulation. The advantages of using the crystal material KDP stems from the fact that it is readily available in good qualities and has a higher Pockel's coefficient than that of other materials, although the latter is not nearly as important in the degree of modulation as is the particular axes orientation of the crystal with respect to the directions of the electric field and the light propagation. As will be shown later, the 45° cut of the crystal surface relative to the x and y-axes yields the maximum light modulation for an electric field applied perpendicular to the light beam.

Other objects, features and advantages will become apparent from the following detailed description when read in conjunction with the appended claims and the attached drawing wherein like reference numerals refer to like parts throughout the several figures, and in which:

FIGURE 5 is a pictorial illustration of a Pockel's cell according to the invention used in conjunction with other apparatus to provide an optical modulator system, which system can be used as a light shutter, communications system or used in various other applications;

FIGURE 6 is an elevational view of one face of the crystal shown in FIGURE 2, schematically illustrating the birefringence of the crystal;

FIGURE 7 is a schematic illustration of the polarization characteristics of a light beam after passing through the cell of FIGURE 2; and FIGURE 8 shows one application of the modulator of the invention.

To aid in an understanding of the invention, a brief discussion will be presented relating to a conventional Pockel's cell and the extent of light modulation that can be achieved thereby. The Pockel's effect is observed in a single crystal of material when an electric field is created therein and polarized light is passed through the crystal. In the absence of an electric field, the crystal normally is selected as being birefringent, and the character of the polarized light passing through the crystal is altered to some degree, whereby the phase relation between the perpendicular components into which the polarized beam can be resolved has been changed. The application of a voltage across the crystal to establish an electric field therein causes changes in the birefringence of the crystal, usually increasing this characteristic, which also increases the amount or degree of phase alteration between the two perpendicular components. Cubic crystals are different in that they exhibit no birefringence in the absence of an electric field and become birefringent in the presence thereof. Thus, in the presence of the field, the two perpendicular components of a polarized light beam travel through the crystal at different relative speeds than they otherwise would to alter the relative phase relationship therebetween. In such case, the nature of the polarization of the light beam emerging from the crystal is altered from that which enters the crystal. As stated earlier, very little modulation or change of this phase relation can be effected in conventional Pockel's cells, which is primarily attributable to the small Pockel's coefficient of the crystals used.

Figure 1:
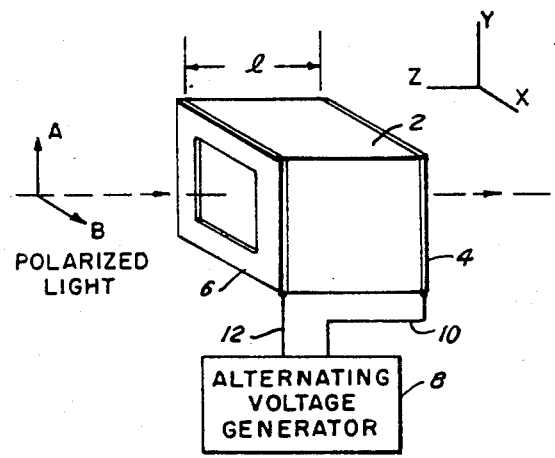
FIGURE 1 shows, in perspective view, a single crystal of material which exhibits the Pockel's effect but with the crystal axes oriented according to a conventional Pockel's cell.

Referring specifically to FIGURE 1 which illustrates a conventional Pockel's cell, a single crystal 2 comprised of a material which exhibits the Pockel's effect is cut so that the three crystal axes x, y and z of the crystal are perpendicular to the various faces thereof. A pair of metallic electrodes 4 and 6 are attached to opposite faces of the crystal which are perpendicular to the z-axis, with openings being provided in the electrodes to permit the passage of light through the crystal along the z-axis. The electrodes are connected to an alternating voltage generator 8 by means of leads 10 and 12, respectively, to establish the necessary electric field in the crystal. Polarized light (elliptically, circularly or linearly polarized), which is substantially monochromatic, is passed through the length $l$ of the crystal parallel to the z-axis. Under these conditions, it can be shown that the amount of phase modulation between the two perpendicular components into which the polarized light can be resolved is governed by Equation 1 above. Also, the light beam may traverse the crystal along any axis with the effect being observed, although again, the effect is not as great as shown. As is well known, polarized light can be resolved into two perpendicular vectors (which are schematic representations of the vibrating electric or magnetic fields associated therewith) whose magnitudes vary sinusoidally with a particular phase relation therebetween depending upon the character of the polarized light. This is equivalent to saying that circularly, elliptically or linearly polarized light can be resolved into two perpendicular linearly polarized beams having a given phase relation therebetween. In FIGURE 1, the polarized beam is shown schematically to be resolved into two vectors A and B, with vector A being parallel to the y-axis of the crystal, and vector B being parallel to the x-axis and both traversing the crystal along the z-axis. The creation of an electric field within the crystal causes it to become more birefringent, so that the two perpendicular components A and B travel through the crystal at different relative speeds than they would otherwise, thus further altering the phase relationship therebetween. In such case, the nature of the polarization of the emergent light beam is altered from that which enters the crystal. Since the electric field is also applied along the z-axis over the length $l$, and since the electric field is equal to the ratio $V/l$, Equation 1 becomes (2) $\Delta\phi = 2\pi N_o^3 r_{ij} V / \lambda_o$ where V is the voltage applied between the electrodes 4 and 6. The subscripts $i$ and $j$ of the Pockel's coefficient refer, respectively, to the electric field direction and the direction of stress created in the crystal as a result of the field. From Equation 2, it can be seen that the amount of modulation of the light is directly proportional to the magnitude of the voltage applied between the electrodes. Since the Pockel's coefficient is relatively small in available materials, a relatively high voltage is required to produce any considerable amount of light modulation whatsoever. In fact, for a KDP crystal, which has a relatively large Pockel's coefficient, cut with the axes as shown in FIGURE 1, a voltage of about 7.4 kv. is required to produce a phase change between the two perpendicular components of 90° in its traversal of the entire length of the crystal. This is a very large voltage, which is impractical in many applications.

Figure 2:
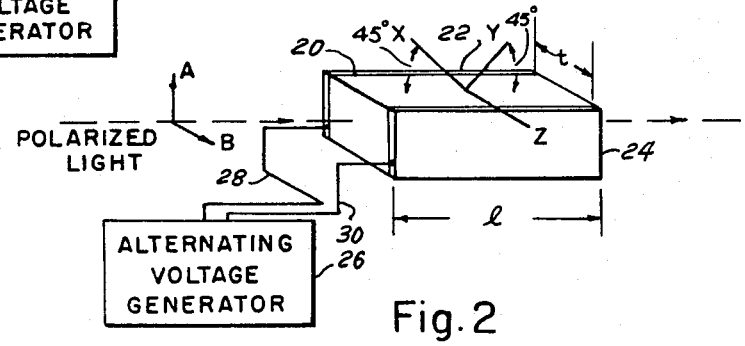
FIGURE 2 shows, in perspective view, a single crystal of KDP which exhibits the Pockel's effect with the axes oriented according to the invention and illustrates one embodiment thereof.

The present invention utilizes a single crystal of material which exhibits the Pockel's effect, preferably a crystal of KDP, wherein the KDP crystal is cut so that each of the x and y-axes thereof make an angle of 45° to one of the surfaces with the z-axis being parallel to this surface. Under these conditions with the light beam to be modulated traversing the crystal perpendicular to the z-axis and at 45° to each of the x and y-axes, it has been found that a very considerable improvement in the amount of light modulation can be achieved. As shown in FIGURE 2, a KDP crystal 20 is cut according to the foregoing axes orientation with electrodes 22 and 24 being attached to opposite faces thereof which are perpendicular to the z-axis. The electrodes are connected to an alternating voltage generator 26 by means of leads 28 and 30, respectively, to establish an electric field in the crystal throughout a distance $t$, as shown, with the polarized light being passed through the crystal along a length $l$ which is perpendicular to both the z-axis and the electric field, wherein the x and y-axes of the crystal are at 45° to the direction of light propagation. Under these conditions it can be shown that the amount of light modulation is governed by the relation (3) $\Delta\phi = \pi N_o^3 r_{ij} l V / t \lambda_o$ It will be noted that the factor 2 no longer exists in the relation. Since the length of the crystal no longer cancels out of the relation because the electric field is applied in a different direction, it can be seen that another parameter can be controlled to increase the light modulation, namely by increasing the ratio $l/t$. This permits the use of a much smaller voltage to achieve the desired modulation of the light beam and can be seen to be a considerable improvement over the modulator of FIGURE 1. For example, for a crystal of KDP cut according to FIGURE 2 with $t$ being equal to about .04 inch and $l$ being equal to about 3.0 inches, the ratio $l/t$ is about 75, and thus a relative phase change between the two perpendicular, linear components of a polarized beam can be altered by 90° in traversing the length of the crystal with a voltage as low as about 100–200 volts. This is a very small voltage as compared to the 7.4 kv. required in the conventional embodiment of FIGURE 1.

Although the foregoing embodiment shown in FIGURE 2 provides considerable improvement in the modulation of a polarized light beam, it can be seen that as the ratio $l/t$ is increased to where the length $l$ is much, much greater than the thickness $t$, changes in temperature which cause the length of the crystal to increase or decrease dominates the ratio $l/t$ and thus controls the extent of light modulation. To obviate the necessity of providing external means for controlling the temperature of the cell, a temperature compensated Pockel cell light modulator is provided in the further embodiment shown in FIGURE 3. A pair of identical KDP crystals each cut exactly as described with reference to FIGURE 2 are joined together at their ends, each being of identical lengths and widths. The first crystal 40 has electrodes 44 and 46 attached to opposite sides thereof and are connected to an alternating voltage generator 52 by means of leads 54 and 56, respectively, to establish an electric field within the crystal parallel to the z-axis and perpendicular to the direction of light propagation. Again, the $x$ and $y$ crystal axes are 45° to the direction of light propagation. The second crystal 42 has its z-axis oriented 90° to the z-axis of crystal 40 with electrodes 48 and 50 being attached to opposite faces thereof and connected to the alternating voltage generator 52 through leads 58 and 60, respectively. Again, the electric field is established within the crystal 42 parallel to its z-axis with the $x$ and $y$ crystal axes being at 45° to the direction of light propagation.

Since KDP is normally birefringent in the absence of an electric field, polarized light traversing the length $l$ thereof will have a fast component and a slow component. For purposes of illustration, component A, which is perpendicular to the z-axis of crystal 40 will be considered as the faster component, and component B being the slower. In the absence of the electric field in either crystal 40 or 42, the polarized light will traverse the length of crystal 40 with component A leading component B when it emerges from the crystal. However, as the light enters crystal 42, component A now becomes the slower and component B the faster. In the absence of an electric field, the light will emerge from crystal 42 with the exact same polarization characteristics as it had when entering crystal 40, since the phase alteration between the components caused in crystal 40 is exactly canceled in crystal 42. This is a consequence of the z-axes of crystals 40 and 42 being at 90° to each other.

Figure 3:
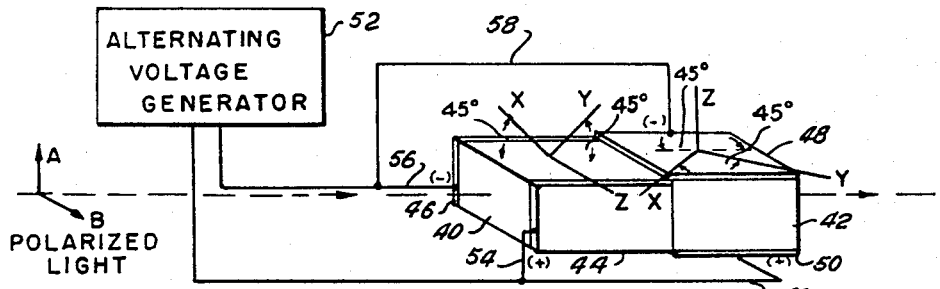
FIGURE 3 shows, in perspective view, another embodiment of the invention.

In the presence of an electric field in both crystals 40 and 42, however, the speed of the faster component A in crystal 40 is increased further with the speed of the slower component B being decreased from that which it would ordinarily have if an electric field is present of the proper polarity, such as shown in FIGURE 3. Similarly, component B, which is now the faster in crystal 42, has its speed again reduced over that which it would ordinarily have. Thus, a cancellation effect is not produced, but a cumulative effect which is the addition of the phase changes effected between components A and B in the two crystals 40 and 42 as a result of the electric fields. On the other hand, a cancellation effect would result if the relative polarities of the electric fields established in the two crystals is reversed. When the length of crystal 40 is changed as a result of a temperature change, the length of crystal 42 is changed by exactly the same amount. This will result in the change of the ratio $l/t$ of crystal 40 and thus the amount of phase changes. However, since the ratio $l/t$ of crystal 42 is changed by exactly the same amount, and since components A and B are reversed relative to the z-axis in the two crystals, any change in the phase relationship therebetween in crystal 40 as a result of temperature is exactly canceled in crystal 42. The reason for this is that the total amount of phase change resulting from a change in the length of one crystal is due to the normal birefringence of the crystal without the electric field, and thus the phase change in the two crystals is opposite. The system shown in FIGURE 3 therefore provides self temperature compensation.

Figure 4:
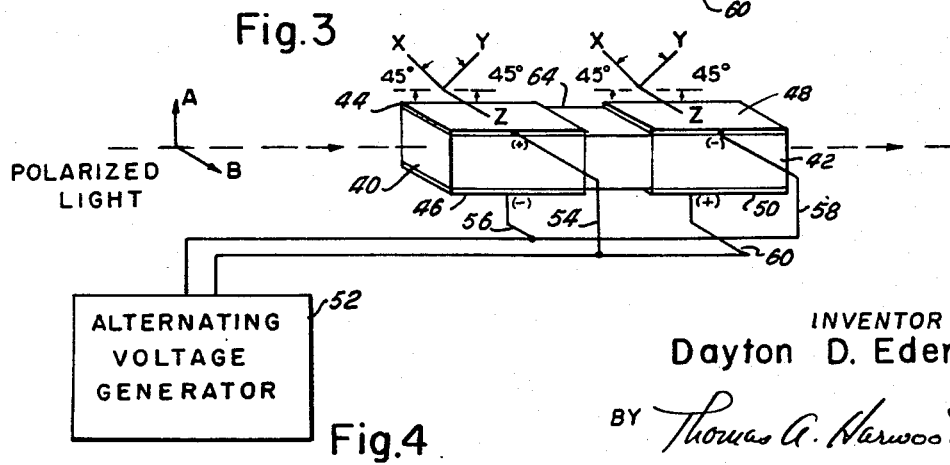
FIGURE 4 shows, in perspective view, a further embodiment of the invention.

A further embodiment of the invention is shown in FIGURE 4 for providing a wide angular field of view. It has been found that for light beams entering the configurations of either FIGURE 2 or FIGURE 3 other than at exactly perpendicular to the z-axis and at 45° to each of the $x$ and $y$-axes, the amount of phase alteration between components A and B is changed and is a function of the angle through which it traverses the crystal. This is a result of the different birefringence of the crystal for light beams traversing it at different angles with respect to its crystal axes. If the two perpendicular components of all light beams striking crystal 40 regardless of their angle of incidence can be rotated 90° with respect to the z-axis of the crystal when they enter crystal 42, the phase change resulting from an angular deviation will be completely canceled.

Referring to FIGURE 4, an optical rotator 64 is inserted between the two crystals and comprises a quartz crystal cut with its z-axis perpendicular to both the z-axes of crysals 40 and 42 and parallel with the traversal of the light beam through the crystals. An optical rotator of this kind is well known and by selecting its length properly in relation to the wavelength of light used, it will rotate the perpendicular components of the light beam by 90°. Thus, light entering crystal 40 at other than perpendicular to the z-axis of the crystal and 45° to each the $x$ and $y$-axes is rotated 90° before it enters crystal 42. Since components A and B have now been interchanged by the rotator, the z-axis of crystal 42 is situated parallel to the z-axis of crystal 40 to give the desired temperaure compensation effect, in addition to a greatly increased angular field of view.

From the foregoing it is seen how the light modulation is greatly increased in the invention, and the following discussion relates to the modulation of a polarized light beam by a Pockel's cell. Referring to FIGURE 5, unpolarized light of constant intensity is directed onto a linear polarizer 70 and then onto a quarter-wave plate 72 to produce circularly polarized light impinging on the crystal cell 40 of the embodiment shown in FIGURE 4, for example. Circularly polarized light is preferred as will be shown later, although linear or elliptically polarized light can also be used. Moreover, any suitable light source can be used which emits a beam of polarized light which is substantially monochromatic. The latter is preferred in order to preserve more easily the identity of the particular wavelength of light being modulated. The Pockel's cell used in the system being described is shown being the same as that of FIGURE 4 with its associated electrodes and alternating voltage supply, although the embodiments of FIGURES 2 or 3 can be used as an alternate thereto. Under the influence of the applied field, the Pockel's cell produces a change in the polarization characteristics of the light beam, and if the electric field is alternating, the emergent light at any point along its path will undergo continuously changing states of polarization.

FIGURE 6 is an elevational view of the face of any of crystals 20, 40 or 42 shown in FIGURES 2–4 with the direction of propagation of the light being out of the plane of the drawing perpendicular to the z-axis and at 45° to each of the $x$ and $y$-axes, and illustrates schematically the Pockel's effect. Here, the crystal is cut so that the electric field created by the application of a voltage between the electrodes 44 and 46 is perpendicular to the direction of propagation of the light, or parallel to the z-axis of the crystal. With no electric field applied, the circularly polarized light, or any other type of light for that matter, will traverse the quartz crystal with a change in its nature of polarization as indicated by the index ellipse $Z_1$, which denotes the extraordinary index of refraction along the z-axis (corresponding to the major axis of the ellipse). However, when an electric field is created between electrodes 44 and 46 of one polarity, the index of refraction for linear components of light perpendicular to the z-axis and at 45° to each the $x$ and $y$-axes is increased, and is illustrated as such by index ellipse $Z_2$. When an electric field is created between the electrodes 44 and 46 of the opposite polarity, the reverse is true such as illustrated by index ellipse $Z_3$. When circularly polarized light traverses the crystal in the presence of an electric field applied between the two electrodes, its polarization will be changed from circular to some form of elliptical, where the polarization ellipse of the emergent light will be at 45° to the index ellipse as illustrated in FIGURE 7 as either ellipse A or A', the particular ellipse in FIGURE 7 depending upon the polarity of the applied field. If the field is alternating, the polarization of the light emerging from the cell will go from one polarization ellipse (indicated as field of first polarity) to the other polarization ellipse (indicated as field of second polarity) and back again over one complete cycle of the electric field, with the polarization ellipse becoming the special case of a circle somewhere in between as shown. It should be noted that the ellipses in FIGURE 6 represent schematically the indices of refraction of the crystal 40, whereas the ellipses of FIGURES 7 represent schematically the polarization characteristics of the light beam, and the two should not be confused.

Referring again to FIGURE 5, the presence of an electric field in the crystal produces a resultant emergent beam of light which represents a phase modulation between the linear components into which the incident polarized light beam is resolved. The same thing occurs in crystal 42 as previously described, where the linear components of the light beam are essentially interchanged relative to the z-axis to produce the overall desired effect. In order to utilize this in practical applications, the phase modulation ordinarily has to be converted into an intensity modulation, and to do this, an analyzer 74 is placed in the path of the beam to convert the phase modulation to an intensity modulation, wherein the analyzer is simply another linear polarizer. Referring again to FIGURE 7, if the axis of the analyzer is aligned with either axes or N', which are perpendicular or parallel, respectively, with the z-axis of crystal 40, the intensity of the light emerging from the analyzer and striking a detector 76 will be constant and not vary as a function of the alternating electric field on the Pockel's cell. This is apparent since the axes N and N' pass through the common points of both polarization ellipses and the polarization circle of FIGURE 7. Positioning the analyzer somewhere inbetween, however, yields a light beam striking the detector whose intensity varies sinusoidally, where the maximum amplitude occurs with the analyzer axis at 45° to the z-axis. When the analyzer axis is neither perpendicular nor parallel with the z-axis of crystal 40, an AC signal is generated at the detector output, the magnitude of which is dependent on the degree of misalignment, with the amplitude of the detector output becoming greatest at 45° and less as the analyzer axis approaches a perpendicular or parallel relationship with the z-axis. It can be seen that if the analyzer is rotated relative to the cell in one direction about the light beam, the alternating signal at the detector output has one phase, and if rotated in the opposite direction, the alternating signal has the opposite phase (180° from the former). Thus, it also becomes apparent that the amplitude of the alternating detector signal is an indication of the degree of misalignment of the analyzer and the cell, whereas the phase of the alternating detector signal is an indication of the direction of misalignment. This is one manner in which the light beam emerging from the analyzer can be intensity modulated, which is effected by the relative rotation of the analyzer and cell. This type of modulation is used in the particular application to be described below in conjunction with FIGURE 8.

Assuming that the axis of the analyzer is maintained at a constant angle with respect to the z-axis of crystal 40 but neither perpendicular nor parallel thereto, a constant amplitude alternating signal will be produced at the detector output. By amplitude modulating the alternating voltage applied to the cell, such as by means of any suitable modulator 78 shown in FIGURE 5, the amplitude of the detector output will also be modulated. Since the cell produces a very large amount of phase modulation for a relatively small voltage, the polarization characteristics of the light striking the analyzer can be drastically altered as compared to the original incident beam, and thus the intensity of the light emerging from the analyzer can also be changed over a very large range. Such modulation finds great utility in communications, systems, for example, whereby the alternating voltage is amplitude modulated at an audio rate. Moreover, the range of frequencies usable in modulating the light is restricted only by the capabilities of the electronic driver and extends from DC to many hundreds of megacycles per second.

It should be pointed out that the Pockel's effect works with any type of polarized light. Circularly polarized light is preferred, however, since it can be shown that the intensity of such light striking the detector varies linearly with the magnitude of the voltage applied to the cell, thus giving a linear relationship in the modulation. If linearly polarized light is used, for example, it can be shown that a much larger voltage would be required to achieve a linear operating region.

A specific application of the optical modulator of the invention is shown in the block diagram of FIGURE 8, which shows a system correction and alignment apparatus for maintaining alignment between two components of any equipment about an axis of alignment as shown. A light source 80 characterized by a constant intensity is directed on an optical Pockel's cell 84 through a polarizer 82, wherein the Pockel's cell is that of the invention just described. The light beam traverses the cell and emerges on the opposite side thereof where it is directed to impinge on an analyzer 86, which is a linear polarizer. An alternating voltage applied to the cell from a cell driver 88 causes a phase change in the two perpendicular components of the originally polarized beam emerging from the polarizer 82 which, in turn, causes the polarization characteristic of the beam emerging from the cell to vary. A suitable detector 90, such as a photomultiplier tube or a photovoltaic cell, as examples, is positioned behind the analyzer and registers the intensity of the light emerging from the analyzer and converts the signal or beam into an electrical signal proportional to the intensity thereof.

The function of the system of FIGURE 8 is the comparison of the alignment of the cell 84 and the analyzer 86 when each the cell and analyzer are attached to two components, respectively, of a piece of equipment, such as, for example, the two 90° prisms shown in FIGURE 2 of the above noted copending application. However, for purposes of the present discussion and the description of the comparison and correction apparatus, the pieces of equipment to which the cell and analyzer are respectively attached are referred to as components A and B. Further, it will be assumed that component A and cell 84 are stationary, whereas component B and the analyzer 86 are free to be rotated about the axis of alignment, as shown. The output of the detector 90 is connected to a suitable electrical to mechanical feedback system 92, such as that described in conjunction with FIGURES 2 and 11 of said copending application, which in turn is connected to component B and the analyzer by means of a mechanical linkage 94, for example. The feedback system moves the component B and analyzer about the alignment axis in response to the detector output to maintain an alignment between the cell and the analyzer about the alignment axis. When the cell and analyzer are properly aligned, the light beam striking the analyzer has a polarization such that the detector either does not produce an output signal or the signal produced is such that the electrical to mechanical feedback system does not respond to the signal. As the cell and analyzer become misaligned about the axis of alignment (which implies that components A and B are misaligned), the intensity of the light emerging from the analyzer and striking the detector changes, or is modulated, which causes a signal at the output of the detector to which the electrical to mechanical feedback system responds. The latter realigns the two components in response to this signal, which in turn, causes the signal to decrease. Because of the extreme sensitivity that can be attained in the optical modulator of the invention, components A and B of such a system just described can be maintained in very precise alignment.

Although the invention has been described with reference to a preferred embodiment, including particular applications thereof, certain modifications and substitutions that do not depart from the true scope of the invention will become readily apparent to those skilled in the art, and it is intended that the invention be limited only as defined in the appended claims.

What is claimed is:

1. An optical modulator comprising:
    (a) a single crystal of material exhibiting optical birefringence as a function of an electric field created therein having a pair of opposing faces disposed substantially at 45° to each of the x and y-axes of said crystal and substantially parallel to the z-axis thereof, and
    (b) means for establishing an alternating electric field within said crystal parallel to said z-axis,
    (c) said crystal adapted to transmit a light beam incident on one of said pair of faces along a path substantially perpendicular to said z-axis and at an angle of substantially 45° to each of said x and y-axes.

2. An optical modulator comprising:
    (a) a single crystal of potassium-dihydrogen-phosphate having a pair of opposing faces disposed substantially at 45° to each of the x and y crystal axes and substantially parallel to the z-axis thereof, and
    (b) means for estabishing an alternating electric field within said crystal parallel to said z-axis.

3. An optical modulator according to claim 2 wherein the perpendicular distance between said pair of opposing faces is greater than the distance parallel to said z-axis over which said electric field is established.

4. An optical modulator comprising:
    (a) a pair of single crystals of a material exhibiting optical birefringence as a function of an electric field created therein, each having a pair of opposing faces disposed substantially at 45° to each of the x and y-axes of said crystal and substantially parallel to the z-axis thereof,
    (b) said pair of crystals having substantially equal lengths between their respective opposing faces and substantially equal thicknesses parallel to their z-axes,
    (c) said pair of crystals being aligned along their lengths with the z-axis of one of said pair disposed at substantially 90° to the z-axis of the other of said pair, and
    (d) means for establishing an alternating electric field of substantially equal magnitudes in said pair of crystals parallel to said z-axes thereof.
    (e) said pair of crystals adapted to transmit a beam of light along their lengths substantially perpendicular to each of said pair of opposing faces.

5. An optical modulator comprising:
    (a) a pair of substantially identical single crystals of potassium-dihydrogen-phosphate, each having a pair of opposing faces disposed substantially at 45° to the x and y crystal axes and substantially parallel to the z crystal axis,
    (b) said pair of crystals being joined together at one of their faces with the z crystals axes of said pair of crystals disposed at 90° to each other, and
    (c) means for establishing alternating electric fields of equal magnitudes and opposite polarities in said pair of crystals parallel to the z crystal axes thereof.

6. An optical modulator according to claim 5 wherein the overall length of said pair of crystals is greater than the distance over which said electric field is established in said crystals.

7. An optical modulator comprising:
    (a) a pair of substantially identical single crystals of a material which exhibits optical birefringence as a function of an electric field created therein each having a pair of opposing faces disposed substantially at 45° to the x and y crystal axes and substantially parallel to the z crystal axis,
    (b) said pair of crystals being aligned along an axis perpendicular to each of said pair of opposing faces with the z-axes of said pair of crystals being parallel,
    (c) an optical rotator for rotating a beam of light 90° disposed between said pair of crystals, and
    (d) means for establishing alternating electric fields of equal magnitudes and opposite polarities in said pair of crystals parallel to the z-axes thereof.

8. An optical modulator according to claim 7 wherein said material is potassium-dihydrogen-phosphate.

9. An optical modulator according to claim 8 wherein said optical rotator is comprised of quartz.

10. The process of modulating polarized light through a crystal of birefringent material having x, y, and z crystallographic axes, comprising the steps of:
    (a) applying an alternating electric field within said crystal substantially parallel to said z-axis, and
    (b) passing a polarized beam of light through said crystal substantially perpendicular to said z-axis of said crystal and substantially at 45° to each of said x and y-axes of said crystal whereby said beam of light is modulated upon traversing said crystal.

References Cited

UNITED STATES PATENTS 3,325,646   6/1967   Reichel et al. _____ 350—157

JEWELL H. PEDERSEN, *Primary Examiner.*

W. L. SIKES, *Assistant Examiner.*